United States Patent
Andrews et al.

(10) Patent No.: US 6,645,441 B1
(45) Date of Patent: Nov. 11, 2003

(54) REACTOR FOR PLASMA ASSISTED GAS PROCESSING

(75) Inventors: Peter James Andrews, Wantage (GB); Stephen Ivor Hall, Oxford (GB); Michael Inman, Abingdon (GB); James Timothy Shawcross, Charlbury (GB); David Michael Weeks, Abingdon (GB); Christopher David John Manson-Whitton, Abingdon (GB)

(73) Assignee: Accentus plc, Didcot (GB)

( * ) Notice: Subject to any disclaimer, the term of this patent is extended or adjusted under 35 U.S.C. 154(b) by 0 days.

(21) Appl. No.: 09/890,209

(22) PCT Filed: Feb. 10, 2000

(86) PCT No.: PCT/GB00/00397

§ 371 (c)(1),
(2), (4) Date: Jul. 27, 2001

(87) PCT Pub. No.: WO00/49278

PCT Pub. Date: Aug. 24, 2000

(30) Foreign Application Priority Data

Feb. 16, 1999 (GB) .............................................. 9903400

(51) Int. Cl.[7] .............................................. B01J 19/08
(52) U.S. Cl. .................................................. 422/186.04
(58) Field of Search .................................... 422/186.04

(56) References Cited

U.S. PATENT DOCUMENTS 4,954,320 A * 9/1990 Birmingham et al. .. 422/186.04
6,322,758 B1 * 11/2001 Hall et al. ............. 422/186.04

* cited by examiner

Primary Examiner—Kishor Mayekar
(74) Attorney, Agent, or Firm—Wiliam H. Holt

(57) ABSTRACT

A reactor for the plasma-assisted processing of gaseous media comprising a reactor chamber including a gas permeable bed of active material, a power source for applying across the bed of active material a potential sufficient to establish a plasma in a gaseous medium flowing through the bed of active material and a chamber having an inlet stub and an outlet stub for constraining the gaseous medium to flow through the bed of active material, wherein the bed of active material comprises a matrix of beads of a dielectric material having an assembly of regular arrays of beads in each of which adjacent beads are connected to a high voltage input terminal or an electrical ground.

18 Claims, 3 Drawing Sheets

REACTOR FOR PLASMA ASSISTED GAS PROCESSING

FIELD OF THE INVENTION

The present invention relates to reactors for the plasma-assisted processing of gaseous media and in particular to such reactors for the reduction of the emission of carbonaceous and nitrogenous oxide combustion products from the exhausts of internal combustion engines.

DESCRIPTION OF THE RELATED ART

One of the major problems associated with the development and use of internal combustion engines is the noxious exhaust emissions from such engines. Two of the most undesirable materials, particularly in the case of diesel engines, are particulate matter (primarily carbon) and oxides of nitrogen ($NO_x$). Increasingly severe emission control regulations are forcing internal combustion engine and vehicle manufacturers to find more efficient ways of removing these materials in particular from internal combustion engine exhaust emissions. Unfortunately, in practice, it is found that combustion modification techniques which improve the situation in relation to one of the above components of internal combustion engine exhaust emissions tend to worsen the situation in relation to the other. A variety of systems for trapping particulate emissions from internal combustion engine exhausts have been investigated, particularly in relation to making such particulate emission traps capable of being regenerated when they have become saturated with particulate material.

Examples of such diesel exhaust particulate filters are to be found in European patent applications EP 0 010 384; U.S. Pat. Nos. 4,505,107; 4,485,622; 4,427,418; and 4,276,066; EP 0 244 061; EP 0 112 634 and EP 0 132 166.

In all the above cases, the particulate matter is removed from diesel exhaust gases by a simple, physical trapping of particulate matter in the interstices of a porous, usually ceramic, filter body, which is then regenerated by heating the filter body to a temperature at which the trapped diesel exhaust particulates are burnt off. In most cases the filter body is monolithic, although EP 0 010 384 does mention the use of ceramic beads, wire meshes or metal screens as well. U.S. Pat. No. 4,427,418 discloses the use of ceramic coated wire or ceramic fibres.

In a broader context, the precipitation of charged particulate matter by electrostatic forces also is known. However, in this case, precipitation usually takes place upon large planar electrodes or metal screens.

GB patent 2,274,412 discloses a method and apparatus for removing particulate and other pollutants from internal combustion engine exhaust gases, in which the exhaust gases are passed through a bed of charged pellets of material, preferably ferroelectric, having high dielectric constant. In addition to removing particulates by oxidation, especially electrical discharge assisted oxidation, there is disclosed the reduction of $NO_x$ gases to nitrogen, by the use of pellets adapted to catalyse the $NO_x$ reduction.

A problem which arises with plasma assisted gas processing reactors which include a bed of pellets of a high-dielectric constant material, such as those exemplified in specification GB 2 274 412, is that localised variations in the electric field in the pellet bed can occur, possibly leading to regions of the pellet bed in which the electric field is insufficient to enable a plasma to be established in a gaseous medium flowing through the pellet bed of the reactor.

U.S. Pat. No. 5,746,051 discloses a plasma reactor of the silent discharge type in which an array of flat plate electrodes is interleaved with flat dielectric plates. Such an arrangement, however, limits the space both for gas flow and also for containment of catalytic packing, for example. Also, such an arrangement restricts gas flow to the essentially two dimensional regions between the plates.

U.S. Pat. No. 5,855,855 discloses a corona discharge reactor in the form of a dielectric material tube with a wire inside and a distributed electrode outside the dielectric tube. The active space within which the corona discharge occurs is that contained within the dielectric tube. An assembly of a plurality of such reactors in parallel is also disclosed.

BRIEF SUMMARY OF THE INVENTION

It is an object of the present invention to provide an improved reactor for the plasma-assisted processing of gaseous media.

According to the invention there is provided a reactor for the plasma-assisted processing of gaseous media, comprising a reactor chamber including a gas permeable bed of an active material, means for constraining a gaseous medium to flow through the bed of active material, wherein the bed of active material comprises a matrix array of components of dielectric material, characterised in that the matrix array comprises a plurality of first wire or rod form electrically conducting members interspersed with a plurality of second wire or rod form electrically conducting members, the first and second electrically conducting members being in electrical contact with and enveloped by dielectric material, the plurality of first electrically conducting members being connected together for connection to a first electrical supply terminal and the plurality of second electrically conducting members being connected together for connection to a second electrical supply terminal. In use a power supply is connected to apply an electrical potential across the first and second electrical supply terminals, the potential and the arrangement of the array being such as to establish a plasma in a gaseous medium flowing through the bed of active material. In practice, it will be appreciated, one of the electrical supply terminals will be connected to earth whilst the other is connected to a high voltage input supply.

The dielectric constant or permittivity of the said dielectric material is selected so as to optimise the plasma-assisted processing of the gaseous media flowing through the bed. An intimate contact between the electrically conducting members and their associated dielectric material is preferred to avoid plasma formation in any voids therebetween. The surface of the dielectric material in contact with the associated electrically conducting member may be coated with a metallic or other conducting coating to optimise this contact and prevent plasma formation therebetween and thus increase the electrical efficiency of the reactor for processing of the gaseous media.

In one embodiment of the invention the said dielectric material is in the form of beads. Any one or a mixture of a variety of shapes may be adopted for the beads. The dielectric strength of the bead material is important in determining the size of bead that can be used in order to avoid electrical breakdown through the body of the dielectric. The higher the dielectric strength the smaller the bead size which can be used.

In another embodiment a dielectric coating is applied on electrically conducting members in the form of a wire or rod, the coating thereby forming the component of dielectric material in situ. Such a coating may be deposited by a variety of methods including thermal spraying, for example by plasma-spraying as well as by wet chemical techniques for example by sol-gel processing. Dielectric material in the form of beads or coating can have catalytic properties for processing of gaseous media. This may be particularly useful when for example processing nitrogeneous oxides and hydrocarbons in internal combustion engines as described in our publication WO99/12638 and the specification of our application PCT/GB00/00079. Reductant gases such as hydrocarbon or nitrogen-containing reductant as described in PCT/GB00/00079 can be introduced before, after or into the reactor for processing of gaseous media. The reactor may be incorporated in a complete emission control system, in which emission control system catalyst material and reductant gases are utilised separately from the reactor.

Preferably, the matrix array comprises first and second electrically conducting members enveloped by dielectric material arranged in alternate rows.

Examples of materials for the dielectric material include the aluminas known as LD 350, CT 530, Condea hollow extrudates, DYPAC, T-60 Alumina, T-162 alumina cordierite, $\alpha$, $\chi$ and $\gamma$ aluminas, and aluminas containing mixtures of these phases; ferroelectric materials such as titanates, particularly barium titanate; titania, particularly in the anatase phase; zirconia, vanadia, silver aluminate, perovskites, spinels, metal-doped zeolites and mixtures of these compounds. Examples of zeolites are those known as ZSM-5, Y, beta, mordenite all of which may contain iron, cobalt or copper with or without additional catalyst promoting cations such as cerium and lanthanum. Other examples of zeolites are alkali metal containing zeolites such as sodium Y zeolites. Examples of perovskites are $La_2CuO_4$, $La_{1.9}K_{0.1}CU_{0.95} V_{0.05} O_4$ and $La_{0.9} K_{0.1}CoO_3$. Vanadates including metavanadates and pyrovanadates such as potassium metavanadate, caesium metavanadate, potassium pyrovanadate and caesium pyrovanadate are also examples of dielectric materials. Selection of the permittivity is a parameter for optimisation of the plasma process. For example low permittivity material such as aluminium oxide or zeolite can be used for some plasma processing and higher permittivity material such as barium titanate for others.

BRIEF DESCRIPTION OF THE DRAWINGS

The invention will now be described, by way of example, with reference to the accompanying drawings, in which.

DETAILED DESCRIPTION OF THE INVENTION

Figure 1:
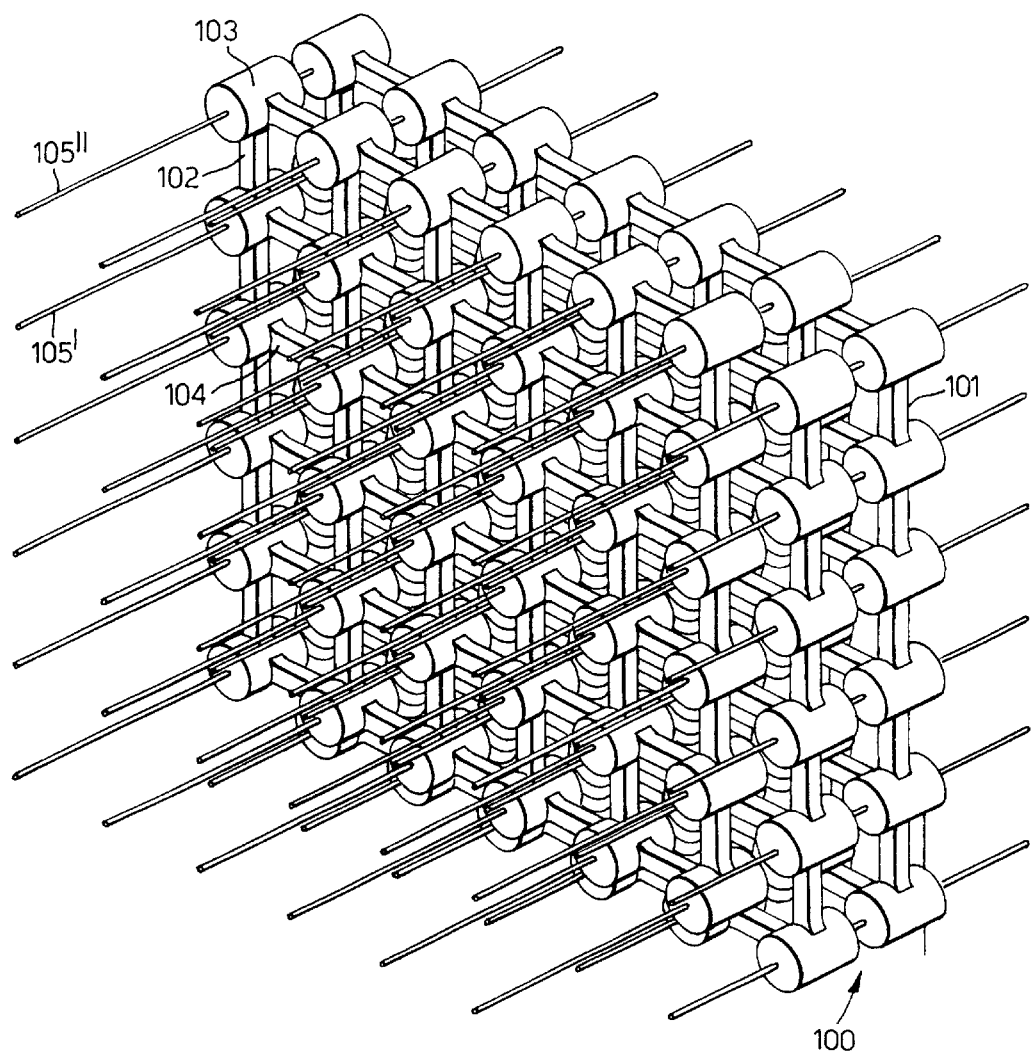
FIG. 1 is a pictorial view of part of a plasma-assisted gas reactor bed of active material embodying the invention.

Referring to FIG. 1, a bed 100 of active material for a reactor for the plasma-assisted processing of gaseous media consists of a matrix 101 made of stacked identical arrays 102 of cylindrical beads 103 separated by spacers 104. (Only two arrays 102 are shown). Corresponding beads of each array 102 are connected together by a plurality of parallel wires 105' and 105".

The wires 105' are connected to a common high voltage input terminal (not shown in FIG. 1) and the wires marked 105" are connected to a common earth point (also not shown in FIG. 1). It should be appreciated that the spacers (104) separating the beads (103) are preferably of a lower permittivity than the beads themselves to promote the plasma-assisted processing of gaseous media. This effect may also be achieved either by making the spacers as thin as possible with respect to the bead or by extending the bead lengthwise along the electrode (105', 105") while keeping the thickness of the spacer to a minimum. In another embodiment of the reactor shown in FIG. 1 the spacers (104) can be removed from the arrays (102). In this example the wires (105') are connected to a common high voltage input location plate and the wires marked (105") are connected to a common earth point location plate. The purpose of the plates is to provide an electrical connection to the electrodes within the assembly and to maintain the geometric shape and the parallel nature of the conductors.

Figure 2:
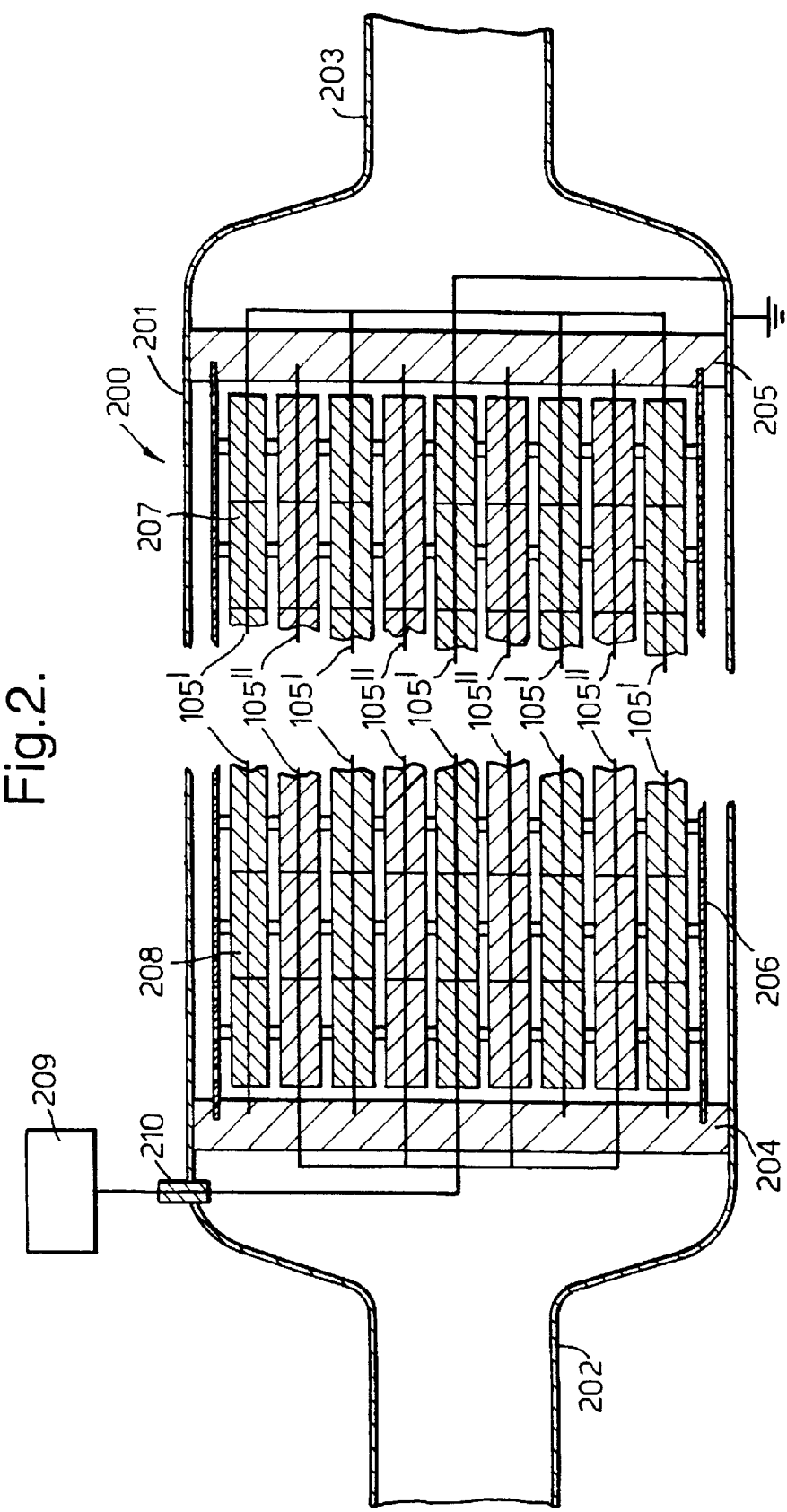
FIG. 2 is a longitudinal section of a schematic plasma-assisted gas reactor embodying the bed of active material shown in FIG. 1.

FIG. 2 shows such a reactor bed in a reactor for the plasma-assisted treatment of the exhaust gases of an internal combustion engine (not shown in the Figure) to reduce noxious emissions therefrom. Referring to FIG. 2, the reactor 200 consists of a stainless steel reactor chamber 201 which has an inlet stub 202 and an outlet stub 203 by means of which it can be incorporated into the exhaust system of an internal combustion engine (not shown in the drawing). Inside the reactor chamber 201 are two support members 204 and 205 made of a ceramic insulating material such as alumina or MICATHERM micaceous glass as described in our publication WO99/20373. Housed into the supports 204 and 205 is a stainless steel cylinder 206 within which there is a matrix 207, such as that described with reference to FIG. 1, of cylindrical beads 208 made of a dielectric material, the permittivity of which is selected so as to optimise the plasma-assisted processing of the gaseous media that is flowing through the reactor.

The connecting wires 105" of one set of beads 208 pass through the support 204 and are connected to a source of pulsed high potential 209 via a high voltage lead-through 210. The connecting wires 105 of the other set of beads 208 pass through the support 205 and thence to an earth point 211 to which the reactor casing 201 and the stainless steel cylinder 206 also are connected. The regions of the supports 204, 205 within the inner cylinder 206 are made to be readily gas permeable so as to keep to a minimum the back-pressure introduced into the exhaust system by the reactor. As explained above, dielectric material can be provided by applying to the electrically conducting wire or rod a coating of a dielectric material by thermal spraying, for example by plasma-spraying or by wet chemical techniques for example by sol-gel processing. Alternatively a metallic electrode can be deposited onto dielectric by any of a variety of techniques including chemical vapour deposition, thermal spraying, wet chemical techniques, screen printing, painting, dipping or other similar technique. Metal-coated dielectric materials are assembled in such a way that the metal is enclosed and in contact with dielectric material. In another embodiment some of the stacked arrays in the reactor can be replaced by catalyst material in the form of spheres, pellets, extrudates, fibres, sheets, coils, granules, foam or honeycomb monolith or as a coating on a ceramic foam or ceramic honeycomb.

Figure 3:
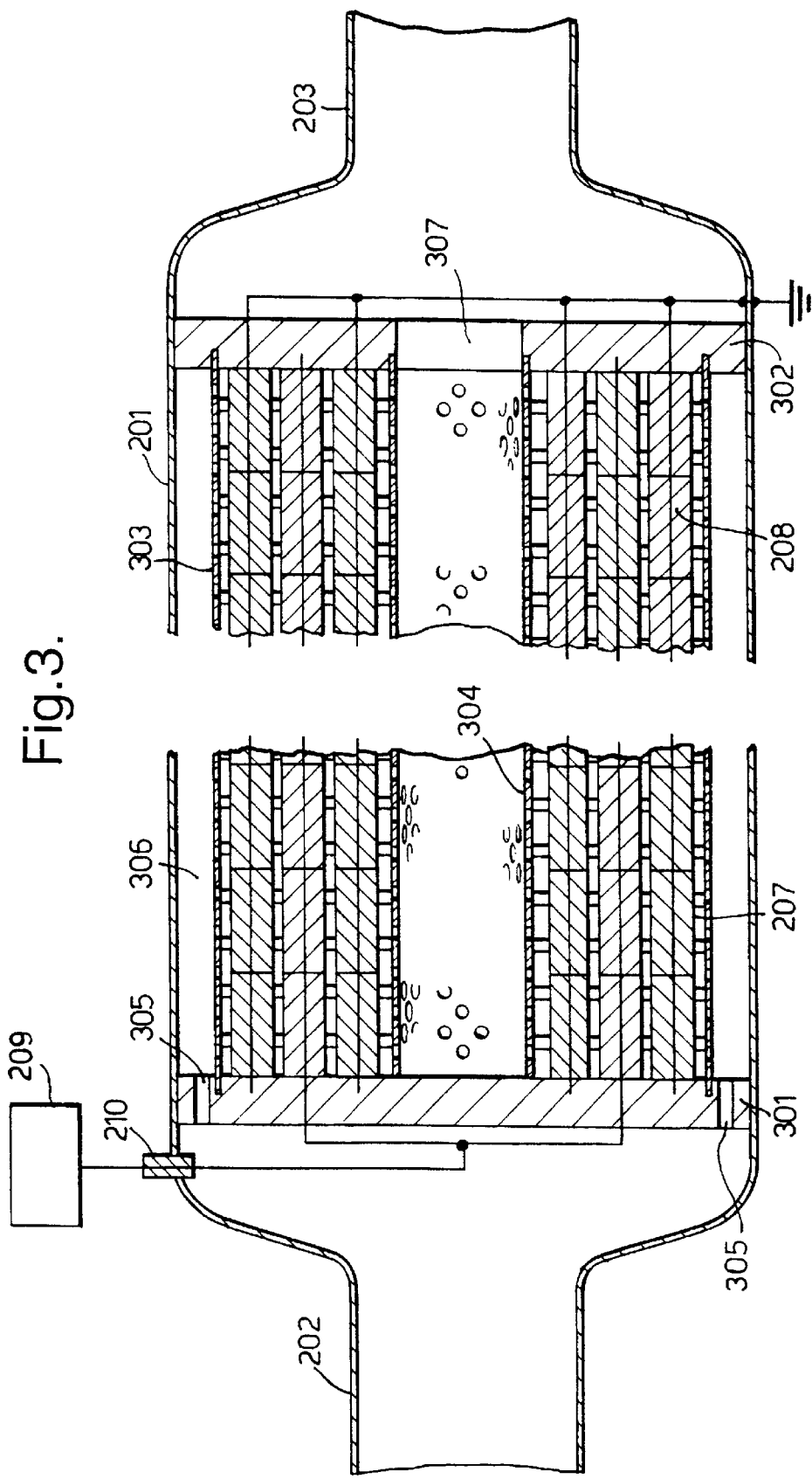
FIG. 3 is a longitudinal section of a second gas reactor embodying a bed of active material such as that shown in FIG. 1.

FIG. 3 shows a reactor for the plasma-assisted treatment of the exhaust gases such as those from an internal combustion engine to reduce noxious emissions therefrom, which is configured to provide a substantially radial flow of exhaust gases through the reactor bed, instead of the axial flow regime of the embodiment of FIG. 1. Those components which are common to both embodiments have the same reference numerals.

Referring to FIG. 3, the majority of the two reactors are the same. The insulating supports 204, 205, however, are replaced by similar supports 301, 302 which are not gas permeable and the matrix 207 of beads 208 is contained between two co-axial cylinders 303, 304 made of perforated stainless steel, both of which are housed into the supports 301, 302. The support 301 has a series of regularly spaced axial holes 305 around its periphery which open into the space 306 between the stainless steel cylinder 303 and the reactor casing 201. The support 302 on the other hand has a hole 307 in its centre. The diameter of the hole 307 in the support 302 is approximately the same as the internal diameter of the inner stainless steel cylinder 304. Exhaust gases entering the reactor chamber 201 are, therefore, constrained to flow radially through the bed 207 of beads 208 before leaving the reactor chamber 201 via the hole 307 in the centre of the support 302.

The power supply 209 is adapted to produce pulses having a potential of the order of kilovolts to tens of kilovolts and repetition frequencies in the range 50 to 5000 Hz, although higher frequencies of the order of tens of kilohertz can be used. Pulsed direct current is convenient for automotive use, but alternating potentials for example triangular or sine waves of the same or similar characteristics can be used. The potential applied is selected according to the design of the plasma reactor and to optimise the plasma-assisted processing of the gaseous media.

It will be appreciated that the power supply may advantageously be located adjacent to the reactor as described in our publication WO99/05400 and the specification of our application PCT/GB00/00108.

What is claimed is:

1. A reactor for the plasma-assisted processing of gaseous media, comprising a reactor chamber including a gas permeable bed of an active material, conduits for constraining a gaseous medium to flow through the bed of active material, wherein the bed of active material comprises a matrix array of components of dielectric material, wherein the matrix array comprises a plurality of first wire or rod form electrically conducting members interspersed with a plurality of second wire or rod form electrically conducting members, the first and second electrically conducting members being in electrical contact with and enveloped by dielectric material, the plurality of first electrically conducting members being connected together for connection to a first electrical supply terminal and the plurality of second electrically conducting members being connected together for connection to a second electrical supply terminal.

2. A reactor as claimed in claim 1, wherein a power supply is connected to apply an electrical potential across the first and second electrical supply terminals for establishing a plasma in a gaseous medium flowing through the bed of active material.

3. A reactor as claimed in claim 1, wherein the electrically conducting members and their associated dielectric material are in intimate contact to avoid plasma formation in any voids therebetween.

4. A reactor as claimed in claim 3, wherein surfaces of dielectric material in contact with the associated electrically conducting member are coated with an electrically conducting coating to optimize this contact and prevent plasma formation therebetween.

5. A reactor as claimed in claim 3, wherein the electrically conducting members are formed by deposition onto their associated dielectric material.

6. A reactor as claimed in claim 1, wherein the dielectric material is in the form of beads.

7. A reactor as claimed in claim 6, wherein the beads are separated by spacers.

8. A reactor as claimed in claim 7, wherein all the beads are the same size.

9. A reactor as claimed in claim 6, wherein the beads are cylindrical or spherical in shape.

10. A reactor as claimed in claim 1, wherein a dielectric coating is applied on the electrically conducting members, which are in the form of a wire or rod, the coating thereby forming a component of dielectric material in situ.

11. A reactor as claimed in claim 1, wherein the said first and second electrically conducting members are respectively arranged in alternate rows.

12. A reactor as claimed in claim 1, wherein the matrix array is monolithic.

13. A reactor as claimed in claim 1, wherein connection means are provided for connecting the reactor into the exhaust system of an internal combustion engine.

14. A reactor as claimed in claim 1 in association with a power supply adapted to produce pulsed dc potentials of the order or kilovolts or tens of kilovolts and with repetition frequencies of the order or kilohertz.

15. A reactor as claimed in claim 1, incorporated in a complete emission control system for an internal combustion engine, in which catalyst material and reductant gases are utilized separately from the reactor.

16. A reactor as claimed in claim 1, in or in association with which catalyst material is utilized, the catalyst material being selected from the group consisting of alumina, titanias zirconia, vanadia, silver aluminate, perovskites, spinels, metal-doped zeolites, alkali metal-containing zeolites, vanadates and mixtures thereof.

17. A reactor as claimed in claim 16, wherein the catalyst material is in the form of spheres, pellets, extrudates, fibers, sheets, coils, granules, foam or honeycomb monolith or as a coating on a ceramic foam or ceramic honeycomb.

18. A reactor as claimed in claim 1, wherein the said matrix array includes catalyst material in the array interspersed between said components of dielectric material.

* * * * *